United States Patent [19]

Lance et al.

[11] Patent Number: 4,691,425
[45] Date of Patent: Sep. 8, 1987

[54] METHOD AND APPARATUS FOR REPLACING A FILTER IN A VESSEL

[75] Inventors: Jacques Lance, Mulhouse; Georges Müller, Dijon, both of France

[73] Assignee: Commissariat a l'Energie Atomique, Paris, France

[21] Appl. No.: 562,416

[22] Filed: Dec. 16, 1983

[30] Foreign Application Priority Data

Dec. 17, 1982 [FR] France .................. 82 21204

[51] Int. Cl.⁴ .................. B23P 19/04; B01D 46/04
[52] U.S. Cl. .................. 29/402.08; 55/490; 55/DIG. 9
[58] Field of Search .......... 29/557, 558, 157.3 R, 29/157.3 A, 157.3 B, 157.3 C, 157.3 D, 157.4, 402.14, 402.18; 228/183; 55/478, 480, 481, 490, 503, DIG. 9

[56] References Cited

U.S. PATENT DOCUMENTS

| | | | |
|---|---|---|---|
| 3,063,224 | 11/1962 | Getzin | 55/493 |
| 3,263,704 | 8/1966 | Boisjoly | 55/DIG. 9 X |
| 3,354,616 | 11/1967 | Lucas | 55/DIG. 9 X |
| 4,320,566 | 3/1982 | Boyer et al. | 29/157.4 |

FOREIGN PATENT DOCUMENTS

| | | | |
|---|---|---|---|
| 629116 | 3/1962 | Belgium | 55/490 |
| 2396580 | 2/1979 | France . | |

Primary Examiner—Howard N. Goldberg
Assistant Examiner—Carl J. Arbes
Attorney, Agent, or Firm—Pearne, Gordon, McCoy & Granger

[57] ABSTRACT

The present invention relates to a method and apparatus for replacing a filter placed in a vessel or casing.

The filter is placed in a casing, one member of the latter surrounding the filter being slid in order to give access thereto from all sides. Once the new filter has been fitted, it is applied to a frame with the aid of bars having cams, which act on the filter by means of a fastening frame.

Application to the filtration of gases containing radioactive dust.

12 Claims, 3 Drawing Figures

METHOD AND APPARATUS FOR REPLACING A FILTER IN A VESSEL

BACKGROUND OF THE INVENTION

The present invention relates to a method and to an apparatus for replacing a filter placed in a vessel, which gives better accessibility to the filter to be replaced than the prior art means.

In the presently used ventilation system, inspection doors giving access to the filter to be disassembled are provided on the walls of casings or vessels. In the case of a relatively small casing, e.g. if there is only a single filter in the air path, accessibility via the inspection door is adequate. However, in the case of a large casing, there can be several juxtaposed filters (sometimes up to about 10), and a single inspection door does not provide adequate accessibility. It is then possible to provide several doors on the different faces of the vessel or even a larger opening or manhole, which enables an operator to enter the vessel for dismantling the filers, although this operation is generally disadvantageous.

SUMMARY OF THE INVENTION

The present invention aims at eliminating these disadvantages, by proposing a method and an apparatus for replacing a filter giving a better accessibility thereto than the prior art methods.

According to the main feature of the method according to the invention, the latter comprises the stages of sliding part of the casing located in the vicinity of the filter on to another part of said casing, replacing the filter by a new filter and returning the movable part of the casing to its initial position.

According to another feature of this method, after replacing the filter by a new filter, the latter is applied to a frame or metal sheet by means of at least one bar having at least one cam, which can cooperate with the face of the filter opposite to the frame.

According to a preferred embodiment, a fastening frame is placed between said filter face and the cams, in order to better distribute the stress exerted by the cams.

The invention also relates to an apparatus for performing this method. According to the main feature of the apparatus, it comprises at least one hollow member permitting the passage of the gas circulating in the casing, said hollow member having, at each of its ends, means making it possible to tightly fix it to the fixed parts of the casing located in the vicinity of the filter. This hollow member has a random cross-section, e.g. rectangular, circular or the like.

According to another feature of the apparatus according to the invention, it comprises at least one angle iron, whose ends are connected to the fixed parts of the casing, at least part of said angle iron being located in the vicinity of the filter.

In order to apply the filter to the aforementioned frame or metal sheet, the apparatus also has at least one bar, with at least one cam able to cooperate with the filter face opposite to the frame.

In this case, each of the aforementioned angle irons has at least one notch, in which can be placed one end of the bar.

Finally, the apparatus can have a fastening frame placed between the filter and the cams, in order to distribute the stress exerted by the latter on the filter.

BRIEF DESCRIPTION OF THE DRAWINGS

The invention is described in greater detail hereinafter relative to non-limitative embodiments and with reference to the attached drawings, wherein show.

DETAILED DESCRIPTION OF THE INVENTION

Figure 1:
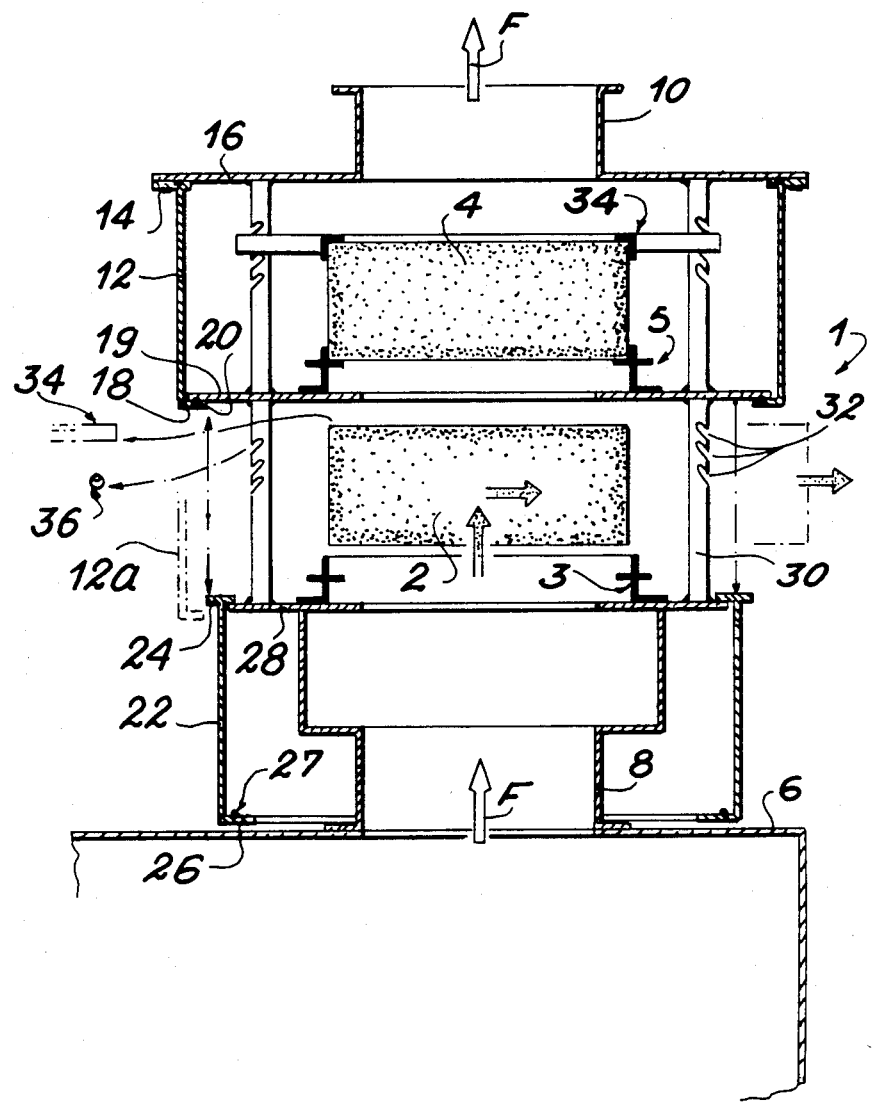
FIG. 1 a diagrammatic vertical sectional view of a casing element containing an apparatus according to the invention.

FIG. 1 shows a vessel or casing element, carrying the general reference numeral 1, and which contains two filters 2 and 4 for filtering polluted air from a room or area 6. The casing element 1 is connected to area 6 by an intake sleeve 8 and to a not shown extraction device by a discharge sleeve 10. In the case described here, the air present in area 6 contains radioactive dust, which is retained by the first filter 2, whilst the second filter 4 is used for filtering other products, particularly iodides. The upstream faces of filters 2 and 4 are tightly applied to frames 3 and 5 respectively. More particularly in the case of filter 2, this permits replacement without breaking the confinement of the contaminated zone, e.g. by means of the process described in French Patent Application No. 2 488 436, filed on Aug. 6, 1980 in the name of the Applicant company.

The drawing shows that filter 4 is surrounded by a metal sheet 12, in the form of a hollow member, permitting the passage of air and whose cross-section, perpendicular to the air direction symbolized by arrows F, is rectangular. It can be seen that member 12 is equipped in its upper part with a frame 14, which can be tightly bolted to a metal sheet 16, fixed with respect to vessel 1. In its lower part, sheet 12 has another frame 18, which can be tightly applied to a metal sheet 19, which is also fixed relative to vessel 1. Whereas frame 14 is bolted to sheet 16, frame 18 is simply applied to sheet 19 by means of a joint 20. The dimensions of member 12 with respect to the distance between sheets 16 and 19 are calculated in such a way that the bolting of frame 14 to sheet 16 brings about the tight application of frame 18 to sheet 19.

When it is wished to replace filter 4, frame 14 is unbolted from sheet 16 and part 12 of casing 1 is slid downwards. It passes into a position 12a, diagrammatically represented by mixed lines in the drawing. This has the effect of giving access to filter 4 from all sides of casing 1, so that the worn filter 4 can be more easily replaced by a new filter. In the same way, when it is wished to replace the lower filter 2, metal sheet 22 surrounding it in the normal operating position is slid downwards and is shown in the disassembly position in FIG. 1. In its upper part, sheet 22 has a frame 24, which can be bolted to sheet 19 and reference has been made to this hereinbefore. The effect of this bolting operation is to apply the lower frame 26 of member 22 to sheet 28 of casing 1, sealing being ensured by a joint 27. Thus, member 22 is fixed to sheets 19 and 28, in the same way that member 12 is fixed to sheets 16 and 19. Thus, access to filter 2 is possible from all sides and it is possible to replace the same by using, in the case where the air of area 6 contains radioactive dust, the method described in the aforementioned French Patent application. However, this method is not necessary for replacing filter 4, because the latter is in an uncontaminated area.

Another aspect of the invention relates to the fastening of new filters to frames 3 and 5. It can be seen in FIG. 1, that sheets 28 and 19 on the one hand and 19 and 16 on the other are connected by rigid bars or angle irons 30. Each of these angle irons 30 has one or more notches 32, in which are placed the ends of bars equipped with cams used for applying filters 2 and 4 to frames 3 and 5 respectively and which will be described hereinafter relative to FIG. 2.

FIG. 1 shows filter 2 in the disassembly position, ready for removal from casing 1. The support bars such as 36, together with the fastening frame 34 have been removed and these elements are diagrammatically shown to the left of the drawing. The function of frame 34 will be explained hereinafter relative to FIG. 2. Filter 4 is shown in the normal operating position, applied to frame 5. It is also possible to see frame 34, by means of which the bars provided with the cams exert a compressive stress on filter 4.

These arrangements can best be seen from the perspective view of FIG. 2, where it is once again possible to see vessel 1, with, in its lower part, the intake sleeve 8, and, in its upper part, the discharge sleeve 10. It is also possible to see the filter 2, diagrammatically represented by mixed lines, and which is sealingly applied to frame 3 with, above it, filter 4 applied in a tight manner to frame 5. FIG. 2 shows the position corresponding to the replacement of filter 4, i.e. with member 12 in the lowered position, frame 14 being disengaged from the upper sheet 16. It is also possible to see those angle irons 30 which correspond to the upper filter 4 and whose ends are rigidly connected to sheets 19 and 16, there being two groups of angle irons 30, one of which corresponds to lower filter 2 while the other corresponds to upper filter 4.

It is possible to use flat bars as shown in the drawing, or alternatively bent sheets, or members having a random shape, provided that they have a good rigidity. It is also possible to see frame 34, which is formed from angle irons or bent sheets and whose shape and dimensions are such that it assumes the shape of filter 4. The application of the latter to frame 5 is obtained by bars 36, each of which has two cams such as 38, able to cooperate with frame 34. The ends of bars 36 are housed in notches 32 of angle irons 30.

Figure 2A:
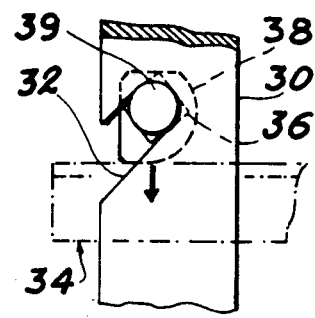
FIG. 2 a diagrammatic perspective view with partial breaking-away of the apparatus of FIG. 1, and FIG. 2a a view along arrow F2 of FIG. 2, illustrating the way in which bars for applying the filters to a frame or metal sheet are fixed in the angle irons.
Figure 2:
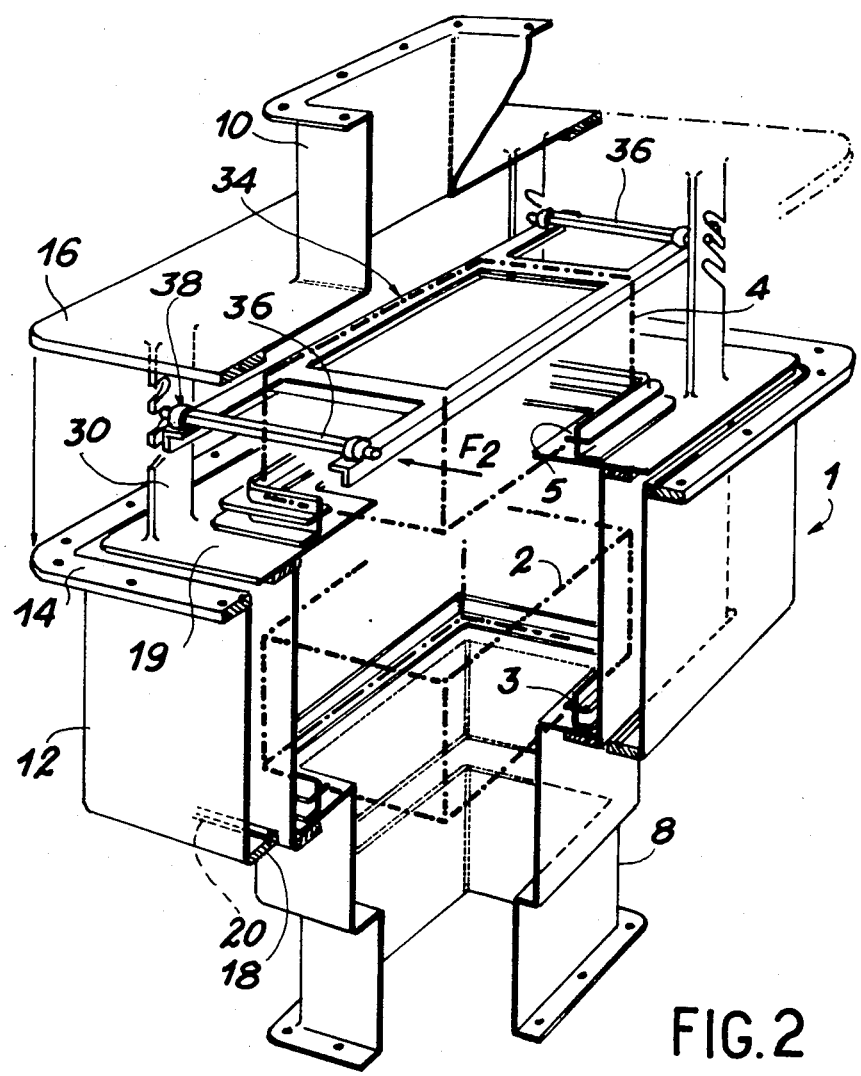

FIG. 2a illustrates the position of the end of bars 36 in notches 32. It is possible to see that the bar 36 is square and has at each of its ends a cylindrical portion 39, whose dimensions exactly correspond to those of the bottom of notch 32. Thus, on turning bar 36 into the fixing position, cam 38 bears against frame 34, which has the effect of forcing upwards again bar 36 and consequently locking the end 39 thereof in the upper portion of notch 32.

Thus, the method and apparatus of the invention have particularly interesting advantages, because they ensure excellent accessibility to the filter to be removed. Thus, there is no longer any inspection door and, because it is possible to slide one pacing element, it is possible to obtain access to the filter from any side. Moreover, time is saved because only one of the frames of the moving elements is bolted to the fixed parts of the casing, the fastening of the other element being brought about automatically by the bolting of the first. Finally, the use of bars with cams ensures an effective application of the filter to the frame such as 3 and 5 by a simple, fast method, whilst the use of a fastening frame makes it possible to distibute the stresses exerted by the cams. The latter are consequently not in direct contact with the filter and consequently cannot damage it.

Finally, it is obvious that the invention is not limited to the embodiment described hereinbefore, and in fact numerous variants are possible thereto without passing beyond the scope of the invention. For example, although in the embodiment described the moving parts of the casing are moved upstream, it is also possible to envisage an arrangement in which they move downstream, provided that the dimensions of the casing at this point permit this movement. The invention is also applied in the case of casing having larger dimensions, where there are several juxtaposed filters such as 2 and 4. With regards to the cross-section of the moving parts, they can be of a random nature, e.g. square, rectangular or even circular, as a function of the nature of the casings and filters used. Finally, although the invention has been described relative to filters tightly applied to frames, it can also be used for other fitting types, e.g. in the case of filters fitted in a slide member.

What is claimed is:

1. A method for replacing a filter placed in a vessel to filter a fluid circulating in said vessel, said vessel comprising:

a hollow upstream part;

a hollow downstream part separated from said upstream part by a space, said filter being positioned in said space and having a first face and an opposed second face;

a hollow member movable between a closed position, in which it closes said space and surrounds said filter when fluid is circulating through all of said hollow members, and an open position allowing access to the filter from all sides thereof; and means for sealingly fixing said hollow member to said upstream part and said downstream part to contain said circulating fluid within said hollow members, said method comprising the following steps:

(a) unfixing said hollow member from said upstream part and said downstream part, (b) moving said hollow member from its closed position to its open position, (c) removing said filter, (d) putting a new filter in place in said vessel, (e) moving said hollow member back from its open position to its closed position, and (f) fixing said hollow member to said upstream part and said downstream part.

2. A method as in claim 1, said vessel further comprising a frame for supporting said filter in position, said frame being located between said upstream and downstream parts, and being contained within said hollow member when in a closed position, said method further comprising tightly applying said first face of the new filter to said frame placed inside the vessel after the new filter has been put in place in the vessel.

3. A method as in claim 2, wherein said vessel includes at least one rotatable bar on which is mounted at least one cam having a cam surface, wherein applying said first face of the new filter to said frame is carried out by rotating said bar such that said cam surface can cooperate with said second face of the new filter to hold said new filter in position on said frame.

4. A method as in claim 3, wherein said vessel includes a fastening frame, said method further comprising placing the fastening frame between said second face of the new filter and said cam.

5. An apparatus for replacing a filter placed in a vessel to filter a fluid circulating in said vessel, said vessel comprising:
  a hollow upstream part, and
  a hollow downstream part separated from said upstream part by a space, said filter being positioned in said space, and having a first face and an opposed second face,
  said apparatus comprising:
  a hollow member movable between a closed position, in which it closes said space and surrounds said filter, when fluid is circulating through all of said hollow members and an open position allowing access to the filter from all sides thereof; and
  means for sealingly fixing said hollow member to said upstream part and said downstream part to contain said circulating fluid within said hollow members.

6. An apparatus as in claim 5, wherein said hollow member has a rectangular cross section.

7. An apparatus as in claim 5, wherein said hollow member has a circular cross section.

8. An apparatus as in claim 5, wherein said means for fixing said hollow member to said upstream part and said downstream part includes;
  a first flange integral wth said hollow member;
  bolting means for sealingly bolting said flange to one of said upstream part and said downstream part; and
  a second flange integral with said hollow member which is sealingly applied to the other of said upstream part and said downstream part when the first flange is bolted to said one of said upstream part and downstream part.

9. An apparatus as in claim 5, further comprising a frame for supporting said filter in position, said frame being located between said upstream and downstream parts, and being contained within said hollow member when in a closed position, and means for tightly applying said first face of the filter to said frame.

10. An apparatus as in claim 4, wherein said means for applying said first face of the filter to a said frame includes:
  at least one rotatable bar mounted in the vicinity of the filter; and
  at least one cam mounted on said bar and having a cam surface which cooperates with said second face of said filter when said bar is rotated.

11. An apparatus as in claim 10, further comprising at least one angle iron member located between said upstream and downstream parts a portion said angle iron being placed in the vicinity of said filter, said angle iron being fixed with respect to said vessel and having a notch in which said bar is locked when the bar is rotated so that the cam surface cooperates with said second face of the filter.

12. An apparatus as in claim 10, further comprising a fastening frame located within said hollow member when in said closed position, and being placed between said second face of the filter and said cam surface.

* * * * *

UNITED STATES PATENT AND TRADEMARK OFFICE
CERTIFICATE OF CORRECTION

PATENT NO.    : 4,691,425

DATED         : September 8, 1987

INVENTOR(S)   : Jacques Lance et al.

It is certified that error appears in the above-identified patent and that said Letters Patent is hereby corrected as shown below:

Column 6, line 12, claim 10, change "claim 4" to --claim 9--.

Signed and Sealed this

Fifth Day of April, 1988

*Attest:*

*Attesting Officer*

DONALD J. QUIGG

*Commissioner of Patents and Trademarks*